United States Patent [19]

Shanks

[11] 4,356,539
[45] Oct. 26, 1982

[54] VEHICLE HEADLAMP HAVING AN INTEGRAL BUGGY SPRING MOUNTING ASSEMBLY

[75] Inventor: Bruce E. Shanks, Chesterland, Ohio

[73] Assignee: General Electric Company, Schenectady, N.Y.

[21] Appl. No.: 85,368

[22] Filed: Oct. 16, 1979

[51] Int. Cl.³ .............................................. F21V 21/26
[52] U.S. Cl. ..................................... 362/273; 362/61; 362/288; 362/306
[58] Field of Search ............... 362/267, 269, 273, 277, 362/288, 289, 306, 61, 308; 267/160, 164

[56] References Cited

U.S. PATENT DOCUMENTS

| | | | |
|---|---|---|---|
| 1,852,469 | 4/1932 | Muller | 267/164 |
| 2,910,557 | 10/1959 | Bolmeyer | 362/267 |
| 2,910,576 | 10/1959 | Meese | 362/273 |
| 3,065,288 | 11/1962 | Smith | 267/164 |
| 3,508,020 | 4/1970 | Culver | 267/164 |
| 3,898,451 | 8/1975 | Murphy et al. | |
| 4,128,864 | 12/1978 | Brusse et al. | |
| 4,210,841 | 7/1980 | Vodicka | 362/267 |
| 4,240,131 | 12/1981 | Albrecht | 362/267 |

FOREIGN PATENT DOCUMENTS

| | | | |
|---|---|---|---|
| 7809749 | of 1974 | France | 362/267 |
| 882233 | 7/1949 | Fed. Rep. of Germany | 362/273 |
| 752060 | 6/1953 | Fed. Rep. of Germany | 362/289 |
| 2161780 | 7/1973 | Fed. Rep. of Germany | 362/269 |
| 2732895 | 1/1979 | Fed. Rep. of Germany | 313/113 |

Primary Examiner—Peter A. Nelson
Attorney, Agent, or Firm—Philip L. Schlamp; Fred Jacob

[57] ABSTRACT

This invention relates to polymer sealed beam headlamp units and more particularly to a mounting assembly for securing these headlamp units to vehicles. The assembly includes a headlamp having a plurality of mounting blocks integral with and mediately articulated from the reflector portion of the lamp envelope. The mounting blocks project outwardly from the exterior surface of the envelope and reference the lamp beam through the envelope reflector. The mounting blocks have openings for receiving and engaging fasteners therein for securing the headlamp to a vehicle. The fasteners are inserted in the blocks and adjusted relative thereto to referentially relate the lamp alignment to the vehicle. The fasteners are resiliently biased by buggy springs which at least partially surround the fastener. The non-attached head of the fastener is inserted within a slotted vehicle panel and is tensionally secured thereto by the buggy springs. Although a preferred mounting employs three mounting blocks, one of the mountings can be pivotal and non adjustable. Adjustment of the fasteners aligns the headlamp relative to the vehicle. The headlamp in one embodiment is provide with a decorative trim rim about the face of the envelope.

15 Claims, 3 Drawing Figures

VEHICLE HEADLAMP HAVING AN INTEGRAL BUGGY SPRING MOUNTING ASSEMBLY

This application relates to copending applications Ser. No. 85,454; Ser. No. 896,707 and now issued U.S. Pat. No. 4,210,841; Ser. No. 85,354; and Ser. No. 85,353, the disclosures of which are incorporated hereinby reference.

This invention relates to polymer sealed beam headlamp units and more particularly to a mounting assembly for securing these headlamp units to vehicles. The assembly includes a headlamp having a plurality of mounting blocks integral with and mediately articulated from the reflector portion of the lamp envelope. The mounting blocks project outwardly from the exterior surface of the envelope and reference the lamp beam through the envelope reflector. The mounting blocks have openings for receiving and engaging fasteners therein for securing the headlamp to a vehicle. The fasteners are inserted in the blocks and adjusted relative thereto to referentially relate the lamp alignment to the vehicle. The fasteners are resiliently biased by buggy springs which at least partially surround the fastener. The non attached head of the fastener is inserted in a slotted vehicle panel and is tensionally secured thereto by the buggy springs. Although a preferred mounting employs three mountings, one of the mountings can be pivotal and non-adjustable. Adjustment of the fasteners alignes the headlamp relative to the vehicle. The headlamp in one embodiment is provided with a decorative trim rim about the face of the envelope.

Headlamp mounting arrangements customarily comprise a number of heavy metal brackets and rims which structurally secure a headlamp to a vehicle. The lamp envelope is clamped at the lens-reflector interface between a series of mounting rims, which are subsequently attached to a mounting plate, which in turn is attached to the vehicle. The headlamp is first attached to the vehicle and then aimed relative thereto by turning the horizontal and vertical adjustment screws located on the assembly. The mountings are complicated and employ a considerable number of heavy metal parts which add substantially to both vehicle weight and cost. The labor costs of aiming and attaching a headlamp by these mounting arrangements are substantial and further contribute to vehicle costs.

The present invention provides an inexpensive headlamp assembly which securely attaches a lamp directly to a vehicle and eliminates the need for more complicated constructions. The assembly provides a simple low cost mounting which utilizes a minimum number of parts and enables the one step attachment and aiming of a headlamp.

The vehicle headlamp assembly of the present invention exhibits improved shock and vibration absorption characteristics as compared with those of the customary mounting arrangements.

The assembly in a preferred embodiment comprises a sealed beam lamp unit having a polymer envelope comprising a reflector and a light transmissive face. A light source is sealed within the envelope and focused relative thereto for producing a desired beam pattern. Mounting blocks are integrally molded with the exterior surface of the envelope and are outwardly articulated therefrom. The blocks in a preferred embodiment are integrally molded with the reflector portion of the envelope and provide integral reference planes for attaching the lamp to a vehicle. The blocks directly reference the beam produced by the lamp. The blocks are further provided with openings for receiving vehicle fasteners therethrough. Fasteners are adjustably inserted and secured within the mountings blocks. The fasteners are adjusted in the blocks to reference the lamp beam produced by the attached envelope. Particularly, the fastener heads taken in combination define a plane which characterizes the lamp beam. In a preferred embodiment the heads define a plane which is perpendicular to the axis of the lamp. The fasteners are at least partially surrounded by buggy springs which resiliently bias the fastener heads and the mounting blocks. For attachment to a vehicle, the buggy springs are compressed slightly and the heads of the fasteners are inserted in respective slotted vehicle structures. The headlamp is thus secured to the vehicle by the resilient tension of the buggy springs between the mounting blocks and the fastener heads. Particularly, the mounting arrangement is rigid against an inwardly directed force and resilient against all other forces.

In a still further embodiment, the fastener heads are adjusted to define a plane which is not perpendicular to the beam axis to thereby align the lamp to vehicle panel which for instance are non vertical.

In a preferred embodiment, the mounting blocks are substantially perpendicular to the axis of the beam and are secured to the envelope in a triangular configuration. Further not all of the mountings must be adjustable and resiliently biased. One of the three can for instance be pivotal.

In these embodiments the assembly positionally and resiliently alignes the lamp in an aimed relation within the vehicle.

The assembly in a still further embodiment is provided with a trim rim integral with the lamp face for decoratively interfacing the lamp with the vehicle.

These and other objects and features and a more complete understanding of the aspects of this invention will be apparent from the following detailed description which taken in conjunction with the drawings represents a perferred embodiment of this invention.

DETAILED DESCRIPTION

Figure 1:
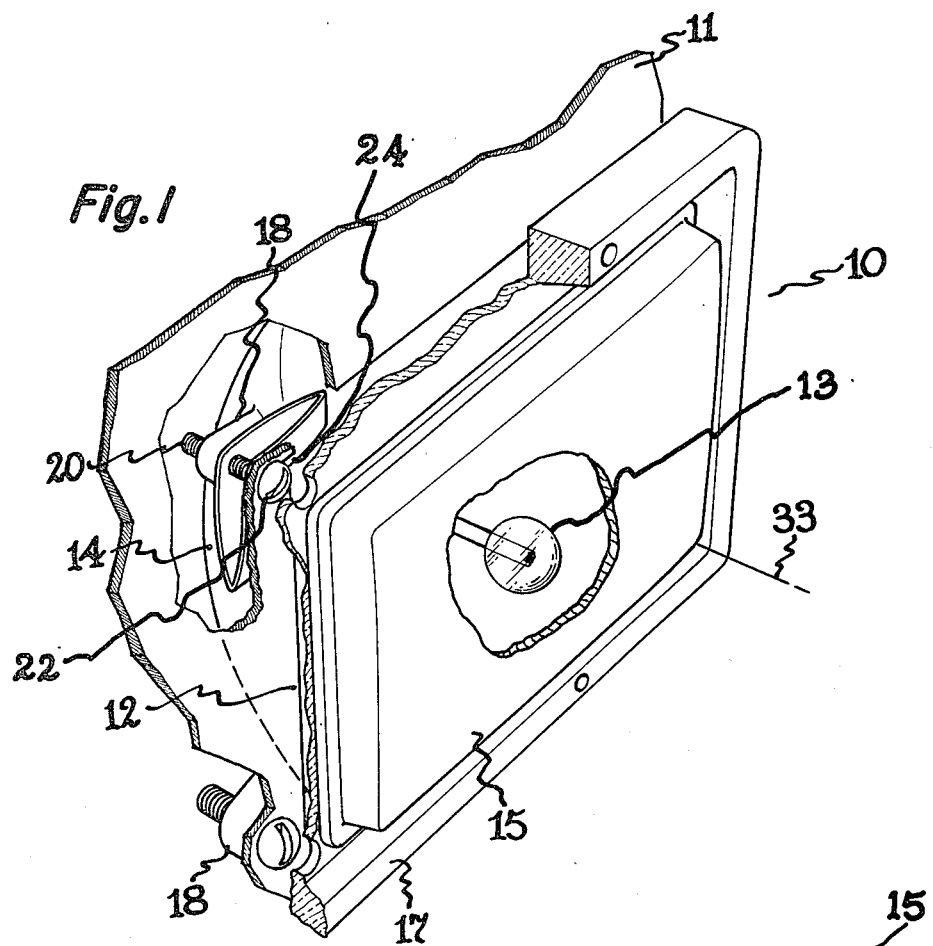
FIG. 1 is an exploded perspective view of the mounting block assembly of the present invention as attached to a vehicle.
Figure 2:
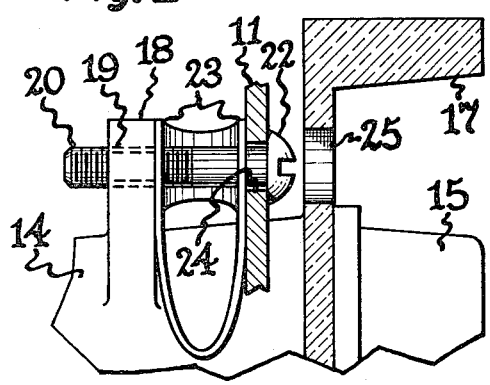
FIG. 2 is a cross sectional view of a fastener assembly employed in combination with the mounting block assembly of the present invention.

Referring now to FIG. 1, a headlamp 10 having integral mounting blocks is shown attached to a vehicle 11. The headlamp 10 has an envelope 12 which includes a polymer reflector 14 which is sealed to a polymer and/or glass lens 15. A light source 13 is sealed and focused within the envelope 12 such that the optical axis of the beam substantially coincides with the axis of the lamp. In a preferred embodiment, the light source 13 is focused relative to the reflector 14 and takes full advantage of the reflective properties of the reflector 14. A rim 17 is integrally molded with the exterior surface of the envelope 12 and provides a decorative trim about the exterior thereof. Mounting blocks 18 are integrally molded with the envelope 12 and provide surfaces which exteriorly reference the beam produced by the enclosed light source 13 referenced relative to the envelope. The blocks 18 are referentially disposed relative to the reflector 14 which in combination with the light source 13 establishes the desired beam pattern. The blocks 18 thus provide a reference structure which characterizes the beam. In a preferred embodiment the blocks 18 are integrally molded perpendicular to the optical axis of the lamp and hence the axis of the beam.

The beam pattern produced by the lamp unit 10 is the combined result of the interaction of the light source 13 with the envelope 12. Specifically, the light source 13 is positioned within the envelope 12 to achieve an optically optimal light distribution and hence the light source 13 is focused relative to the envelope 12 regardless of whether the light source 13 is located at the exact geometric focus of the conical reflector 14. In a particular embodiment, the light source 13 is focused relative to the reflector 14 alone or alternatively is focused relative to the reflector 14 and lens 15 in combination. In the former instance an optimal beam pattern is established by the reflector 14 which is subsequently modified by the lens prescription. The reflector 14 thus structurally references the beam without regard for lens tolerances and the beam axis substantially coincides with the lamp axis. In the latter case, the light source 13 is adjusted within an envelope 12 comprising both a lens 15 and reflector 14 to produce an adequate beam pattern. Although the envelope focused beam pattern is inherently less precise than the reflector focused beam pattern the beam axis remains substantially parallel to the optical axis of the envelope.

In either case the lamp beam is characterized by a plane which is approximately perpendicular to the beam axis (Z axis, the axis in the major direction of its propogation). The reference plane of a lamp is defined conventionally, by the forward surfaces of the reference beads located on the face of a lamp. The bead surfaces are ground to define a reference plane which perpendicularly characterizes the lamp beam. In particular, three beads are employed on the lamp face wherein the surface of the three beads determine the plane.

The assembly 10 of the present invention eliminates the need for reference beads on the face of the lamp. The mounting blocks 18 provide the reference for the attached lamp 10. The blocks 18 can include a variety of different configurations and have through openings 19 for adustably receiving fasteners 20 therein. The fasteners 20 are for instance screws which are threaded within the blocks 18 and adjustable relative thereto. The heads 22 of the fasteners 20 define a plane which references the lamp 10 to the vehicle 11. Although in a preferred embodiment the fasteners 20 defines a plane substantially perpendicular to the axis of the lamp, the plane can be substantially non perpendicular to the axis of the lamp 10 to, for instance, align the lamp 10 with a non vertical vehicle panel 11.

Resilient means such as a buggy springs 23 are provided to at least partially surround the fasteners 20. The buggy springs 23 generally comprise two mono leaf springs attached in an opposed relation such that the combination has a substantially oval cross section. The buggy springs 23 are resiliently disposed between the mounting blocks 18 and the fastener heads 22. The lamp assembly is attached to the vehicle 11 by slightly compressing the buggy spring 23 and slipping the fastener heads 22 into their respective slotted vehicle openings 24. The lamp 10 is secured to the vehicle by a combination of the fasteners 20 and the resilient tension of the buggy springs 23 which cause the fastener heads 22 to tensionally abut the vehicle 11. The lamp unit 10 is thus rigid against inwardly directed forces and resilient against all other forces. Additionally the fasteners 20 are adjustable after the lamp has been applied to the vehicle to, for instance, realign the lamp 10 relative to the vehicle 11.

The buggy springs 23 can be integrally molded with the mounting blocks 18 or alternatively, attached thereto by the fasteners 20 or cement to form a unitary mounting block construction in combination with the fastener 20.

The lamp unit 10 in a preferred embodiment is provided with a trim rim 17 about the perimeter of its face to decoratively interface the lamp with the vehicle 11. The trim rim 17 is provided with access openings 25 for inserting a tool such as a screw driver therethrough for rotating the enclosed adjustable fastener 20 to realign the lamp 10 relative to the vehicle.

Figure 3:
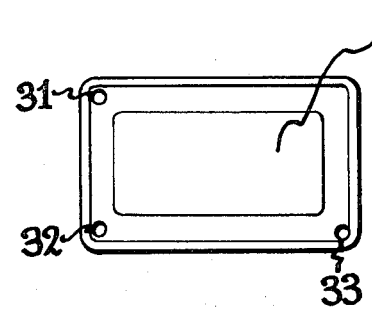
FIG. 3 is a front view of the readlamp assembly of the present invention.

Referring now to FIG. 3 the headlamp assembly of the present invention is shown in front view. The mounting assemblies 31, 32 and 33 are disposed in a triangular configuration about the perimeter of the lamp face 15 and particularly at the corners of a rectangular envelope. This configuration is particularly advantageous because it allows the individual adjustable mountings 31, and 33 to be dedicated to the vertical and horizontal adjustment of the lamp 10 respectively. More particularly mountings 31 and 32 establish an axis about which mounting 33 adjusts the lamp 10. Mountings 32 and 33 define an axis about which mounting 31 adjusts the lamp. The mountings 31 and 33 are respectively dedicated to up-down and left-right adjustment of the lamp 10. Mounting 32 does not actively contribute to adjustment of the lamp 10 and accordingly can in a preferred embodiment be a pivotal mounting as shown in FIG. 1. More specifically, the mounting block 18 of mounting 32 is directly secured to the vehicle 11 without the buggy spring 23. The mounting block 18 is formed with a sufficient inherent resilience to elastically deform in response to adjustment of the other mountings which results in the pivotal mounting.

Accordingly the lamp 10 is readily and demountably attached to the vehicle 11 by the assembly of the present invention. The lamp 10 can also be easily replaced with a similar buggy spring headlamp and installed in a prealigned relationship with the vehicle 11 by removing the pivotal fastener and slipping the mountings 31 and 33 from their respective vehicle slots with re-attachment being the reverse of this procedure.

Although the invention has been described in a preferred form with a certain degree of particularity, it is understood that the present disclosure of the preferred embodiment is made by way of example and that various modifications in the details of construction may be resorted to without departing from the true spirit and scope of the invention. It is intended that the patent shall cover, by suitable expression in the appended claims whatever features of patentable novelty exist in the invention disclosed.

What I claim as new and desire to secure by U.S. Letters Patent is:

1. A vehicle headlamp assembly comprising a light source sealed within and focused relative to a sealed polymer envelope having a reflector portion and a light transmissive lens effective for producing a light beam having an axis substantially parallel to the optical axis of said headlamp, three mounting blocks integral with and mediately projecting radially outwardly from, and circumferentially spaced about the exterior surface of said envelope in a triangular configuration, said mounting blocks having axially facing surfaces predeterminedly positioned relative to said axis of said light beam and to said envelope and defining a precisely located reference plane extending transverse to the axis of said light beam and referentially characterizing said light beam and effective for use in predeterminedly aligning said light beam relative to the vehicle by fastening said mounting blocks to respective openings in the vehicle.

2. The vehicle headlamp assembly of claim 1, wherein said reference plane extends substantially perpendicular to the axis of said light beam.

3. The vehicle headlamp assembly of claim 1, wherein said mounting blocks are integral with the reflector portion of said envelope.

4. The vehicle headlamp assembly of claim 1 wherein two of said mounting blocks each has an axially extending through opening for receiving a fastener therein and has a buggy spring secured thereto.

5. The vehicle headlamp assembly of claim 4 wherein said two mounting blocks each further has an axially adjustable fastener extending through said buggy spring and predeterminedly axially positioned in said through opening therein, and the third mounting block has a through opening therein for receiving a fastener, the heads of said predeterminedly positioned fasteners being effective for cooperating with the head of a fastener positioned in said third mounting block for defining a precisely located reference plane for referentially characterizing said light beam and for use in predeterminedly aligning said light beam relative to the vehicle.

6. The vehicle headlamp assembly of claim 5, wherein said third mounting block is elastically deformable and thereby pivotable.

7. The vehicle headlamp assembly of claim 5, wherein each fastener is a screw.

8. The vehicle headlamp assembly of claim 1, wherein said envelope has an integral trim rim about the face thereof.

9. A vehicle headlamp assembly comprising a sealed polymer envelope including a reflector portion and a light transmissive lens, a light source sealed within said envelope and predeterminedly positioned relative to said reflector portion thereof for producing a light beam having an axis substantially parallel to the optical axis of said headlamp, and three mounting assemblies integral with and extending from the exterior of said envelope and arranged about the perimeter of said envelope in a triangular configuration, each mounting assembly being predeterminedly positioned relative to said axis of said light beam and to said envelope, and comprising means defining a predeterminedly precisely located reference plane for refertially characterizing said light beam, and effective for use in both predeterminedly aligning said light beam relative to the vehicle and mounting said headlamp therein by fastening said mounting assemblies to respective openings in the vehicle.

10. A vehicle headlamp assembly comprising a sealed polymer envelope including a reflector portion and a light transmissive lens, a light source sealed within said envelope and pedeterminedly positioned relative to said reflector portion thereof for producing a light beam having an axis substantially parallel to the optical axis of said headlamp, and three mounting assemblies arranged about the perimeter of said envelope in a triangular configuration, each mounting assembly comprising a mounting block integral with and extending radially outwardly from the exterior of said envelope and a fastener element for mating with a complementary fastener element for mounting said headlamp to a vehicle, said fastener elements of said mounting assemblies being predeterminedly positioned relative to said axis of said light beam and to said envelope, defining a precisely located reference plane for referentially characterizing said light beam, and effective for use in both predeterminedly aligning said light beam relative to the vehicle and mounting said headlamp therein by fastening said mounting assemblies to respective openings in the vehicle.

11. The vehicle headlamp assembly according to claim 10, wherein the fastener elements of two of said mounting assemblies are axially adjustable and the third mounting assembly is pivotable for enabling realignment of said light beam relative to the vehicle.

12. The vehicle headlamp assembly according to claim 10, wherein the fastener elements of two of said mounting assemblies are axially adjustable threaded fasteners threadingly engaging axial through openings in said mounting blocks and have head portions for mating with respective complementary fastener elements of said vehicle, said head portions of said fastener elements of said two mounting assemblies and the fastener element of the third mounting assembly defining said precisely located reference plane.

13. The vehicle headlamp assembly according to claim 12, wherein said fastener elements of said two mounting assemblies are screws and said two mounting assemblies further comprise resilient means disposed between said mounting blocks and the heads of said screws thereof, said heads of said screws being effective for mating with respective complementary slots in a panel of said vehicle, and said resilient means being effective for resiliently biasing said heads of said screws against said panel for resiliently mounting the headlamp thereto.

14. The vehicle headlamp assembly according to claim 13, wherein said resilient means are buggy springs.

15. A vehicle headlamp assembly comprising a sealed polymer envelope including a reflector portion and a light transmissive lens, a light source sealed within said envelope and predeterminedly positioned relative to said reflector portion thereof for producing a light beam having an axis substantially parallel to the optical axis of said headlamp, and three mounting blocks arranged about the perimeter of said envelope in a triangular configuration, each block comprising a cantilevered member having a substantially rectangular cross-section, an axially extending through opening in the free end thereof for receiving an axially adjustable fastener therein, and an axially facing surface, the axially facing surfaces of said three mounting blocks being predeterminedly positioned relative to said axis of said light beam and to said envelope and defining a precisely located reference plane extending transverse to the axis of and referentially characterizing said light beam and effective for use in predeterminedly aligning said light beam relative to and mounting said headlamp in the vehicle by fastening said mounting blocks to respective openings in the vehicle.

* * * * *